April 17, 1934. E. F. HUDDLE 1,955,543
MOWER
Filed Aug. 14, 1933
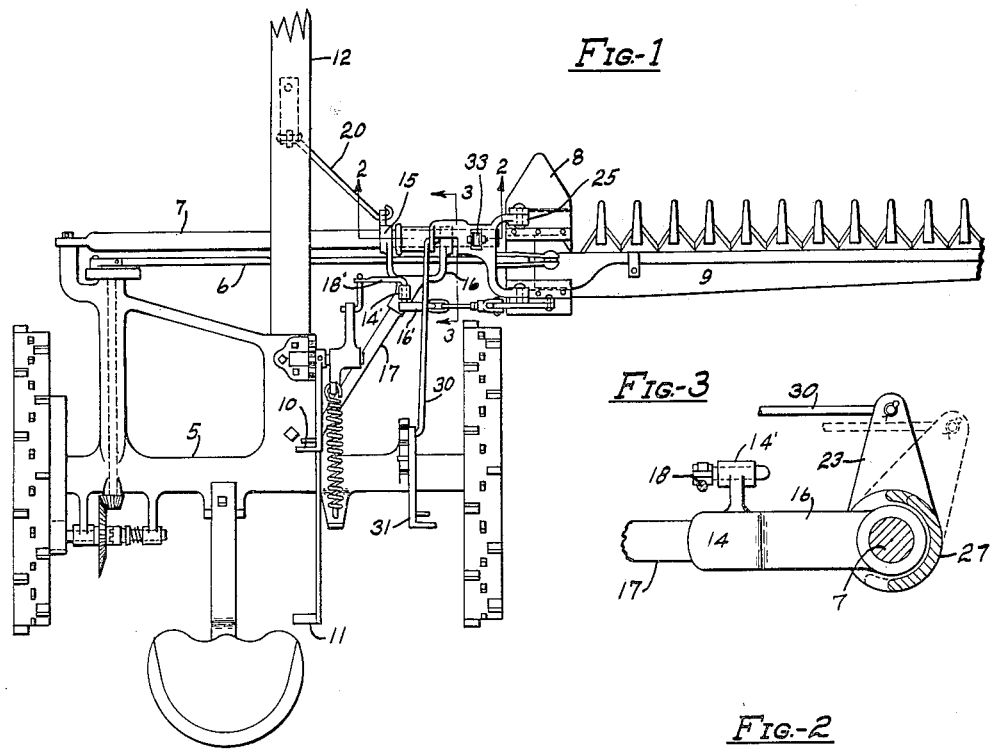
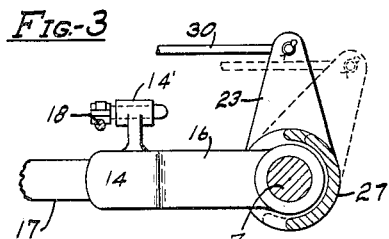
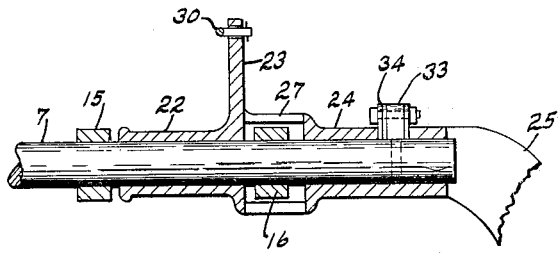
INVENTOR.
EDWIN F. HUDDLE
BY James A. Walsh
ATTORNEY Patented Apr. 17, 1934

1,955,543

UNITED STATES PATENT OFFICE 1,955,543

MOWER

Edwin F. Huddle, Rockford, Ill., assignor to J. I. Case Company, Racine, Wis., a corporation Application August 14, 1933, Serial No. 684,943

4 Claims. (Cl. 56—276)

My invention relates to improvements in mowers comprising means for so connecting the usual coupling-bar and cutting mechanism that the latter will turn freely on the bar without exerting undue strain thereupon and parts associated with the bar and the cutting and lifting mechanisms, which is a common objection to implements of this character and subjecting them to disruption and breakage.

In the accompanying drawing, forming part hereof, Figure 1 is a plan view of a mower embodying my invention; Figs. 2 and 3, detail views taken on the dotted lines 2—2 and 3—3 respectively in Fig. 1; Fig. 4, an enlarged fragmentary plan view of the implement, and Fig. 5 is a detail taken on the dotted line 5—5 in Fig. 4.

In said drawing the numeral 5 indicates the wheeled frame of the mower, 6 the pitman, 7 the coupling-bar, 8 the shoe, 9 the cutting mechanism, 10, 11, levers for controlling the action of the shoe and cutting mechanism, and 12 the tongue, but as these parts are of common and well known construction and arrangement it is deemed unnecessary to specifically describe the same.

A push-rod coupling 14 comprising bearing members 15, 16, is loosely mounted on the coupling-bar 7, and a push-rod 17 extends therefrom and is connected to the frame, said structure being connected by a gag linkage 18 to shoe 8 and to bell-crank 18' and which latter is operable by hand and foot levers 10, 11, respectively, to raise the cutting mechanism when passing over obstructions and when throwing said cutting mechanism into vertical position, the member 15 including an eye connected to the tongue 12 by link 20. The lifting linkages 18 and bell-crank 18', are pivotally supported on yoke 14 by a stud 14' having bearings, as indicated in Fig. 5, for connecting said linkage and bell-crank, the movement of parts of the linkage 18 being controlled by a set screw 15' held in an arm 16'.

My improvement relates particularly to means for rocking the cutting mechanism independently from the coupling 14 and parts associated therewith to incline said mechanism forwardly or rearwardly as desired, and comprises a bearing in the form of a single casting including a sleeve 22 at one end having a standard 23 forming a part thereof, its opposite end 24 being tubular and embodying forks 25 to which the shoe 8 is hinged by pins 26 or otherwise, said ends 22, 24, being connected by a semi-cylindrical portion 27, and the structure being integrally formed. In assembling the mower the yoke 15, 16, and bearings 22, 24, are mounted on coupling-bar 7 in the relation shown in Fig. 4, the cut-away portion 27 straddling yoke member 16 and the standard 23 being connected by link 30 to lever 31. The forked tubular portion 24 is provided with a transverse slot 32 for receiving a stop 33 connected to bar 7 for securing the bearing to the bar, which bearing may be held in adjusted position on the bar by one or more shims, as 34. In this simple manner it will be apparent that by manipulating lever 31 the bearing comprising the parts described is free to rock about the coupling-bar 7, and the cut-away portion 27 will travel about yoke member 16, and therefore when tilting the cutting mechanism forwardly and rearwardly the bearing carrying the shoe and cutting mechanism will freely turn on the coupling-bar entirely independently of parts associated therewith, so that no strain will be exerted upon the tongue, linkage 18, bell-crank 18', or detail mechanisms of the mower designed for other functions, which straining contingency is present in horse drawn mowers where the draft link, as 20, is connected directly to the tongue 12 and the rocking bearing 22, 24, of the cutting mechanism.

I claim as my invention:

1. In a mower, the combination, with the coupling-bar thereof, of a bearing for a cutter-bar comprising a sleeve, a tubular member terminating in a fork adapted to be hingedly connected to a shoe, a semi-cylindrical member connecting said sleeve and tubular member, a push-bar coupling including bearings mounted on the coupling-bar one of said bearings being connected between said sleeve and tubular member and the other of said bearings being positioned adjacent the outer end of the sleeve.

2. In a mower, the combination, with the coupling-bar thereof, of a bearing comprising a sleeve, a tubular member terminating in a fork adapted to be hingedly connected to a shoe and a semi-cylindrical member connecting said sleeve and tubular member, means for securing the bearing to the coupling-bar whereby the bearing may be rocked thereon, a push-bar coupling having a bearing mounted on said bar in concentric relation to said semi-cylindrical member, a bell-crank supported on the coupling, means connecting the bell-crank to a shoe, and means for actuating the bell-crank to lift the shoe.

3. In a mower, the combination, with the coupling-bar thereof, of a rocking bearing on the bar, a pivotally mounted shoe on the bearing, a cutter-bar connected to the shoe, means for rocking the bearing to tilt the cutter-bar, a push-bar coupling connected to the mower and to the coupling-bar including members passing astride a portion of the bearing, and means on the push-bar coupling connected to the shoe for vertically adjusting the cutter-bar.

4. In a mower, the combination, with the coupling-bar thereof, of a push-bar having a coupling thereon connected to said coupling-bar, a shoe pivotally connected to the coupling-bar, a cutter-bar mounted on the shoe, a bell-crank secured to the push-bar, means connecting the bell-crank to the shoe, and means for actuating the bell-crank to vertically adjust the shoe and cutter-bar.

EDWIN F. HUDDLE.